United States Patent
Kudo et al.

(10) Patent No.: US 6,316,155 B1
(45) Date of Patent: Nov. 13, 2001

(54) EXTERNAL ADDITIVE FOR ELECTROSTATICALLY CHARGED LATENT IMAGE DEVELOPING TONER

(75) Inventors: Muneo Kudo; Masaki Tanaka, both of Annaka; Yoshiteru Sakatsume, Sakura; Shoji Ichinohe, Takasaki; Mitsuo Asai, Annaka, all of (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/524,907

(22) Filed: Mar. 13, 2000

(30) Foreign Application Priority Data

Mar. 12, 1999 (JP) .................................. 11-067178
Dec. 27, 1999 (JP) .................................. 11-369311

(51) Int. Cl.$^7$ ...................................................... G03G 9/08
(52) U.S. Cl. ........................................................... 430/108.3
(58) Field of Search .................................... 430/106, 109, 430/110, 111, 108.3

(56) References Cited

U.S. PATENT DOCUMENTS

| | | | |
|---|---|---|---|
| 5,378,572 | 1/1995 | Akiyama et al. | 430/110 |
| 5,422,214 | 6/1995 | Akiyama et al. | 430/106.6 |
| 5,914,210 | * 6/1999 | Demizu et al. | 430/110 |

OTHER PUBLICATIONS

Derwent Publications Ltd., Class A12, AN 1993–354231, XP 002150810 (JP 05257316) Oct. 8, 1993.

* cited by examiner

*Primary Examiner*—John Goodrow
(74) *Attorney, Agent, or Firm*—Pillsbury Winthrop LLP

(57) ABSTRACT

An external additive for electrostatically charged latent image developing toner is provied. The additive includes spherical hydrophobic fine silica particles having primary particles having a particle diameter of from 0.01 to 5 μm, which fine silica particles fulfill the following conditions (i) and (ii): (i) when an organic compound which is liquid at room temperature and has a dielectric constant of from 1 to 40 F/m and fine silica particles are mixed in a weight ratio of 5:1 and shaken, the fine silica particles disperse uniformly in the organic compound; and (ii) the quantity of primary particles remaining as primary particles when methanol is evaporated under heating by means of an evaporator from a dispersion prepared by dispersing the fine silica particles in methanol and thereafter the particles are held at a temperature of 100° C. for 2 hours, represents at least 20% of the quantity of primary particles originally present. The external additive does not react or has no interaction with an organic photoreceptor and therefore change in quality does not occur or the photoreceptor is not scraped. Furthermore, it has a good flowability and therefore adhesion of a toner to the photoreceptor does not occur.

13 Claims, No Drawings

EXTERNAL ADDITIVE FOR ELECTROSTATICALLY CHARGED LATENT IMAGE DEVELOPING TONER

BACKGROUND OF THE INVENTION

1. Field of the Invention

The present invention relates to an external additive for an electrostatically charged latent image developing toner which is used to develop an electrostatically charged latent image in electrophotography, electrostatic recording, and the like, and particularly it relates to an external additive for a toner with a small particle size used for obtaining images of high quality.

2. Description of the Prior Arts

Dry developers used in electrophotography and so forth are generally classified into a one-component developer which consist of a toner prepared by dispersing a coloring agent in a binding resin and a two-component developer consisting of the toner and a carrier. In using these developers in copying operation, the developers are required to have good flowability, anti-caking property, fixing property, electrification property, and cleaning properties so as to be adapted to the process. In order to improve especially the flowability, anti-caking property, fixing property, and cleaning properties, inorganic fine particles are frequently added to the toner.

However, the dispersibility of the inorganic fine particles affect toner properties. Non-uniform dispersion of a toner may not give desired flowability, anti-caking property or fixing property, or may result in insufficient cleaning property, causing adhesion of the toner on a photoreceptor and image defect in black spots. For the purpose of improvement at to these problems, the use of inorganic fine particles having been surface-treated to make the surfaces thereof hydrophobic in Japanese Laying-open Publication Nos. 46-5782, 48-47345 and 48-47346.

However, when an organic photoreceptor or a toner with a smaller particle size is used to improve image quality, the use of the inorganic fine particles does not give sufficient performance. The organic photoreceptor has a softer surfaces and a higher reactivity than inorganic photoreceptor; therefore, the life of the organic photoreceptor is liable to become shorter. Such an organic photoreceptor is liable to change in quality or to be scraped at its surface. When a toner with a smaller particle size is used, the toner is low in flowability as compared to toners with a conventional particle size. Therefore, the amount of inorganic particles has to be increased, and thereby the inorganic fine particles may have caused the toner to adhere to the photoreceptor.

SUMMARY OF THE INVENTION

Thus, it is an object of the present invention to provide an external additive comprising silica fine particles which do not react with or have any interaction with an organic photoreceptor and thereby do not cause the photoreceptor to change in quality or to be scraped and which has good flowability and therefore do not cause the toner to adhere to the photoreceptor.

The inventors of the present invention studied earnestly to solve the problems stated above and have discovered that the problems can be solved by an external additive for electrostatically charged latent image developing toner, comprising spherical hydrophobic fine silica particles having primary particles having a particle diameter of from 0.01 to 5 $\mu$m, which fine silica particles fulfill the following conditions (i) and (ii): (i) When an organic compound which is liquid at room temperature and has a dielectric constant of from 1 to 40 F/m and fine silica particles are mixed in a weight ratio of 5:1 and shaken, the fine silica particles disperse uniformly in the organic compound. (ii) The quantity of primary particles remaining as primary particles when methanol is evaporated under heating by means of an evaporator from a dispersion prepared by dispersing the fine silica particles in methanol and thereafter the particles are held at a temperature of 100° C. for 2 hours, represents at least 20% of the quantity of primary particles originally present.

DETAILED DESCRIPTION OF THE PREFERRED EMBODIMENTS

The hydrophobic fine silica particles used in the present invention are spherical hydrophobic fine silica particles of which primary particles have an average of 0.01 to 5 $\mu$m and which meet the conditions (i) and (ii) stated above.

The hydrophobic silica fine particles have been obtained by the step of introducing an $R^2SiO_{3/2}$ unit (wherein $R^2$ represents a substituted or unsubstituted monovalent hydrocarbon group having 1 to 20 carbon atoms) onto the surfaces of hydrophilic fine silica particles comprising an $SiO_2$ unit to obtain hydrophobic fine silica particles to produce first hydrophobic silica particles; and introducing an $R_3^1SiO_{1/2}$ unit (wherein $R^{1'}$ s may be the same or different and each represent a substituted or unsubstituted monovalent hydrocarbon group having 1 to 6 carbon atoms) onto the surfaces of the first hydrophobic fine silica particles.

An example of a more specific method of producing the hydrophobic fine silica particles is as described below.

The hydrophobic silica fine particles according to the present invention can be produced by a process comprising:

the step of subjecting one or more compounds selected from the group consisting of a tetrafunctional silane compound represented by the general formula (I):

$$Si(OR^3)_4 \qquad (I)$$

(wherein $R^3$'s may be the same or different and each represent a monovalent hydrocarbon group having 1 to 6 carbon atoms) or a partial hydrolysis-condensation product thereof, to hydrolysis and condensation in a mixed solvent of a hydrophilic organic solvent such as methanol, ethanol and the like, water and a basic compound such as ammonia and an organic amine, to obtain a hydrophilic fine silica particle dispersion;

the step of adding water to the hydrophilic fine silica particle dispersion thus obtained, distilling of the hydrophilic solvent to convert the dispersion into an aqueous dispersion to completely hydrolyzing alkoxyl groups remaining on the surfaces of the fine particles;

the step of adding to the hydrophilic silica fine particles thus treated, one or more compounds selected from the group consisting of a trifunctional silane compound represented by the general formula (II):

$$R^2Si(OR^4)_3 \qquad (II)$$

(wherein $R^2$ represents a substituted or unsubstituted monovalent hydrocarbon group having 1 to 20 carbon atoms, and $R^4$'s may be the same or different and each represent a monovalent hydrocarbon group having 1 to 6 carbon atoms) and a partial hydrolysis -condensation product thereof, to treat the surfaces of the hydrophilic fine silica particles with it to obtain a first hydrophobic fine silica particle in aqueous dispersion;

the step of adding a ketone solvent to said hydrophobic silica fine particle aqueous dispersion followed by distilling off water to thereby convert the aqueous hydrophobic fine silica particle dispersion into a hydrophobic silica fine particle ketone solvent dispersion, and the step of adding to the hydrophobic fine silica particle ketone solvent dispersion at least one compound selected from the group consisting of a silazane compound represented by the general formula (III):

$$R^1_3SiNHSiR^1_3 \qquad (III)$$

(wherein $R^1$'s may be the same or different and each represent a substituted or unsubstituted monovalent hydrocarbon group having 1 to 6 carbon atoms), and a monofunctional silane compound represented by the general formula (IV):

$$R^1_3SiX \qquad (IV)$$

(wherein $R^1$'s are as defined in the general formula (III), and X represents a hydroxyl group or a hydrolyzable group) to permit the compound to react with silanol groups remaining on the silica fine particles, thereby the silanol groups being triorganosilylated, to enhance the hydrophobic nature of the silica fine particles.

Specific examples of the tetrafunctional silane compound represented by the general formula (I) include tetraalkoxysilanes such as tetramethoxysilane, tetraethoxysilane, tetraisopropoxysilane and tetrabutoxysilane. Specific examples of the partial hydrolysis-condensation product of the tetrafunctional silane compound represented by the general formula (I) include methyl silicate and ethyl silicate. Any of these may be used singly or in combination of two or more.

There are no particular limitations on the hydrophilic organic solvent so long as it dissolves the compound of the general formula (I) or partial hydrolysis-condensation product and the water. It includes alcohols, cellosolves such as methyl cellosolve, ethyl cellosolve, butyl cellosolve and cellosolve acetate, ketones such as acetone and methyl ethyl ketone, and ethers such as dioxane and tetrahydrofuran. Preferred are alcohols. The alcohols include alcohol solvents represented by the general formula (V):

$$R^6OH \qquad (V)$$

(wherein $R^6$ represents a monovalent hydrocarbon group having 1 to 6 carbon atoms). Specific examples include methanol, ethanol, isopropanol and butanol. The particle diameter of fine silica particles formed increases with increase in the number of carbon atoms of an alcohol used, and hence it is desirable to select the type of an alcohol in accordance with the intended particle diameter of fine silica particles.

The above basic substance include ammonia, dimethylamine and diethylamine, and preferably ammonia. Any of these basic compounds may be dissolved in water in a necessary quantity and thereafter the resultant aqueous solution (basic water) may be mixed with the hydrophilic organic solvent.

The water used here may preferably be in an amount of from 0.5 to 5 equivalent weight per mole of the silane compound of the general formula (I) or its partial hydrolysis-condensation product. The water and the hydrophilic organic solvent may preferably be in a ratio of from 0.5 to 10 in weight ratio. The basic substance may preferably be in an amount of from 0.01 to 1 equivalent weight per mole of the silane compound of the general formula (I) or its partial hydrolysis-condensation product.

The hydrolysis and condensation of the tetrafunctional silane compound of the general formula (I) is carried out by a known process in which the tetrafunctional silane compound of the general formula (I) is added dropwise in a mixture of the water and the hydrophilic organic solvent containing a basic substance. The dispersion medium of the hydrophilic fine silica particle mixed-solvent dispersion may be converted into water by, e.g., a process of adding water to the dispersion and evaporating the hydrophilic organic solvent (this process may optionally be repeated). The water added here may preferably be used in a 0.5-fold to 2-fold amount, and preferably about 1-fold amount, in weight ratio based on the total weight of the hydrophilic organic solvent used and alcohol formed.

As specific examples of the trifunctional silane compound represented by the general formula (II), it may include trialkoxysilanes such as methyltrimethoxysilane, methyltriethoxysilane, ethyltrimethoxysilane, ethyltriethoxysilane, n-propyltrimethoxysilane, n-propyltrimethoxysilane, i-propyltrimethoxysilane, i-propyltrimethoxysilane, butyltriethoxysilane, butyltriethoxysilane, hexyltrimethoxysilane, trifluoropropyltrimethoxysilane and heptadecafluorodecyltrimethoxysilane. Partial hydrolysis-condensation products of these may also be used. Any of these may be used alone or in combination of two or more.

The trifunctional silane compound represented by the general formula (II) may be added in an amount of from 1 to 0.001 equivalent weight, and preferably from 0.1 to 0.01 equivalent weight, per mole of the $SiO_2$ unit of the hydrophilic fine silica particles used.

The dispersion medium of the aqueous fine silica particle dispersion may be converted into a ketone solvent from the water, by a process of adding a ketone solvent to the dispersion and evaporating the water (this process may optionally be repeated). The ketone solvent added here may preferably be used in a 0.5-fold to 5-fold amount, and preferably about 1- to 2-fold amount, in weight ratio based on the weight of the hydrophilic fine silica particles used. As specific example of the ketone solvent used here, it may include methyl ethyl ketone, methyl isobutyl ketone and acetyl acetone. Preferred is methyl ethyl ketone.

As specific examples of the silazane compound represented by the general formula (III), it may include hexamethyldisilazane. As specific examples of the monofunctional silane compound represented by the general formula (IV), it may include monosilanol compounds such as trimethylsilanol and triethylsilanol, monochlorosilanes such as trimethylchlorosilane and triethylchlorosilane, monoalkoxysilanes such as trimethylmethoxysilane and trimethylethoxysilane, monoaminosilanes such as trimethylsilyldimethylamine and trimethylsilyldiethylamine and monoacyloxysilanes such as trimethylacetoxysilane. Any of these may be used alone or in combination of two or more.

These may each be used in an amount of from 0.1 to 0.5 equivalent weight, and preferably from 0.2 to 0.3 equivalent weight, per mole of the $SiO_2$ unit of the hydrophilic fine silica particles used.

The hydrophobic silica fine particles used in the present invention have surfaces with a highly hydrophobic nature and without reactive groups such as silanol groups, and have a high dispersibility and a good flowability due to its low aggregation; therefore the particles will bring about good results in view of the object and effects of the present invention.

The particle diameter of the hydrophobic silica particles ranges from 0.01 to 5 $\mu$m, preferably 0.05 to 0.5 $\mu$m, from the viewpoint of improving anti-caking property and fixing property and reducing adverse influence on a photoreceptor. If the particle diameter is less than 0.01 μm, the developer exhibits poor flowability, anti-caking property and fixing property due to aggregation. Particle diameters more than 5 μm may disadvantageously cause a photoreceptor to be changed in quality or scraped, or may cause lowering of the toner adhesion to the photoreceptor.

The fine particles may be optionally further surface-treated with a variety of silane coupling agents, silanes such as dimethyldimethoxysilane, silicones such as dimethylsilicone.

The external additive is preferably added in an amount of 0.01 to 20 parts by weight, more preferably 0.1 to 5 parts by weight per 100 parts by weight of the toner. If the amount of the external additive is too small, the amount of the additive adhered to the toner is small and therefore sufficient flowability can not obtained. The use of external additive in too large an amount affect the electrostatic property of the toner adversely, and is disadvantageous economically.

Toner particles to which the external additive described above include known toners comprising mainly a binding resin and a coloring agent. To toners may be optionally added an electrostatic charge controller.

An toner for developing positive-electrostatically charged latent images to which the external additive according to the present invention can be used as a one-component developer. Such a toner can be mixed with a carrier to produce a two-component developer. When the external additive is used for the two-component developer, it is possible not to add it to toner particles but to add it when mixing the toner particles and a carrier so as to cover the surfaces of the toner with the external additive.

As the carrier, are used known ones such as an iron powder and the like or such powders of which surfaces are coated with a resin.

EXAMPLES

The present invention will be described below in detail by giving Examples and Comparative Examples. However, the present invention is not limited to the following Examples.

Example 1

[Synthesis of spherical hydrophobic fine silica particles]

(1) In a 3-liter glass reaction vessel having a stirrer, a dropping funnel and a thermometer, 623.7 g of methanol, 41.4 g of water and 49.8 g of 28% ammonia water were added and then mixed. The resultant solution was set at 35° C., and 1,163.7 g of tetramethoxysilane and 418.1 g of 5.4% ammonia water began to be simultaneously added thereto with stirring the solution, where the former was dropped over 6 hours and the latter was dropped over 4 hours. After the dropwise addition of the tetramethoxysilane, the solution was still continued to be stirred for 0.5 hour to carry out hydrolysis, and thus a suspension of fine silica particles was obtained. After the glass reaction vessel was fitted with an ester adapter and a condenser, the dispersion was heated to 60 to 70° C. to distil off 1,132 g of methanol, whereupon 1,200 g of water was added, followed by further heating to 70 to 90° C. to distil off 273 g of methanol. Thus, an aqueous suspension of fine silica particles was obtained.

(2) To this aqueous suspension, 11.6 g of methyltrimethoxysilane (i.e., in an amount of 0.01 at a molar ratio on the basis of tetramethoxysilane) was added dropwise over 0.5 hour. After the dropwise addition, the dispersion was still stirred for 12 hours to surface-treat the fine silica particles.

(3) To the dispersion thus obtained, 1,440 g of methyl isobutyl ketone was added, followed by heating to 80 to 110° C. to distil off methanol and water over 7 hours. To the resultant dispersion, 357.6 g of hexamethyldisilazane was added at room temperature, followed by heating at 120° C. to carry out reaction for 3 hours, so that the fine silica particles were trimethylsilylated. Thereafter, the solvent was distilled off under reduced pressure to obtain 477 g of spherical hydrophobic fine silica particles having an average particle diameter of 0.12 μm.

The silane-surface-treated fine silica particles thus obtained were tested in the following way.

Dispersibility Test

The fine silica particles are added to an organic compound as given in Table 1 which is liquid at room temperature, in an organic compound/silica particle weight ratio of 5:1, which are then shaken for 30 minutes by means of a shaker to mix them, and thereafter the state of dispersion is visually observed. An instance where the fine silica particles stand dispersed in their entirety and the whole is uniformly in the state of a slurry is evaluated as "A"; an instance where the fine silica particles stand wetted with the organic compound in their entirety, but not dispersed in the organic compound partly and non-uniform, as "B"; and an instance where the fine silica particles stand not wetted with the organic compound and the both do not mix, as "C". The results are shown in Table 1.

Aggregation Accelerating Test (1) The fine silica particles are added to methanol in a methanol/silica particle weight ratio of 5:1, which are then shaken for 30 minutes by means of a shaker. Particle size distribution of the fine silica particles thus treated is measured with a laser diffraction scattering type particle size distribution analyzer (LA910, manufactured by Horiba Seisakusho).

(2) Next, from the fine-particle dispersion obtained in (1), the methanol is evaporated under heating, by means of an evaporator, and the particles are held at a temperature of 100° C. for 2 hours. The fine silica particles thus treated are added in methanol, and then shaken for 30 minutes by means of a shaker. Thereafter, their particle size distribution is measured in the same manner as the above.

Percentage of particles remaining as primary particles is determined on the basis of the particle size distribution measured in (1). Primary particle diameter is beforehand ascertained by electron-microscopic observation. The results are shown in Table 1.

TABLE 1

| | Organic compound | Dielectric constant (F/m) | Examples | | | Comparative Examples | |
|---|---|---|---|---|---|---|---|
| | | | 1 | 2 | 3 | 1 | 2 |
| Dispersibility: | Acetonitrile | 38 | A | A | A | C | A |
| | Methanol | 33 | A | A | A | C | A |
| | Ethanol | 24 | A | A | A | C | A |
| | MIBK | 13 | A | A | A | C | A |
| | THF | 7 | A | A | A | C | A |
| | Dioxane | 3 | A | A | A | C | C |
| | $D_5$ | 2.5 | A | A | A | C | B |
| | Toluene | 2.4 | A | A | A | C | A |
| | Heptane | 1.9 | A | A | A | C | A |
| Primary particle percentage (%) | | | 100 | 86 | 57 | — | 0 |

Remarks:
MIBK: Methyl isobutyl ketone
THF: Tetrahydrofuran
$D_5$: Decamethylcyclopentasiloxane

[Preparation of an External Additive-Mixed Toner] 96 parts by weight of a polyester resin having a Tg of 60° C. and a softening point of 110° C., and 4 parts by weight of Carmin 6BC (product by Sumika Color K.K.) as a coloring agent were melted and kneaded, ground and classified to obtain a toner having an average particle diameter of 7 μm. With 40 g of the toner, 1 g of the spherical hydrophobic fine silica particles described above was mixed by means of a sample mill to obtain an external additive-mixed toner. Using the same, the degree of aggregation was evaluated in the following manner. [Degree of Aggregation]

The degree of aggregation is a value indicating the flowability of powder. It was measured using a powder tester manufactured by Hosokawa Micron K. K. and a threefold sieve which was fabricated by superimposing a 100-mesh sieve and subsequently a 60-mesh sieve on a 200-mesh sieve. The measurement is carried out by putting 5 g of a toner powder on the uppermost 60-mesh sieve of the threefold sieve, vibrating the threefold sieve for 15 seconds by applying a voltage of 2.5 V to the powder tester, and calculating the degree of aggregation in accordance with the following formula from the weight a (g) of powder remaining on the 60-mesh sieve, the weight b (g) of powder remaining on the 100-mesh sieve and the weight c (g) of powder remaining on the 200-mesh sieve.

Degree of Aggregation (%): (a +b×0.6+c×0.2)×100/5

Evaluation can be made that the smaller the degree of aggregation, the better the flowability, while the larger the degree of aggregation, the worse the flowability.

As a result, the degree of aggregation was 3, indicating that the flowability was good.

Furthermore, adhesion of a toner to a photoreceptor was evaluated in the following manner.

[Evaluation of Adhesion of the Toner to a Photoreceptor]

An external additive-mixed toner and a carrier were provided, with a content of the toner of 8% by weight, the carrier having been prepared by coating ferrite core particles having an average particle diameter of 50 μm with a polyblend of a perfluoroalkyl acrylate resin and an acrylic resin. The toner and the carrier were charged in a two-component resolution developing unit of a printer fitted with an organic photoreceptor, and then a printing test was conducted for 30,000 sheets of paper. In this printing-test, the adhesion of the toner to the photoreceptor can be recognized as unprinted portions on the paper in solid printing.

As a result of the test, any unprinted parts were not observed. Accordingly, the toner adhesion to the photoreceptor was not recognized.

Example 2

467 g of spherical hydrophobic fine silica particles having an average particle diameter of 0.30 μm was obtained in the same manner as in Example 1, except that the temperature 35° C. for hydrolysis of tetramethoxysilane in synthesis of the spherical hydrophobic fine silica particles was changed to 20° C.

The hydrophobic fine silica particles thus obtained were subjected to the dispersibility test and the aggregation accelerating test in the same manner as in Example 1. The results are as given in Table 1.

An external additive-mixed toner was prepared using the spherical hydrophobic fine silica particles thus obtained and evaluated on the degree of aggregation and the adhesion of the toner to the photoreceptor, in the same manner as in Example 1. As a result, the degree of aggregation was 4, indicating that the flowability was good, and no unprinted portions were 5 detected.

Example 3

469 g of spherical hydrophobic fine silica particles having an average particle diameter of 0.09 μm was obtained in the same manner as in Example 1, except that the temperature 35° C. for hydrolysis of tetramethoxysilane in synthesis of the spherical hydrophobic fine silica particles was changed to 40° C.

The hydrophobic fine silica particles thus obtained were subjected to the dispersibility test and the aggregation accelerating test in the same manner as in Example 1. The results are as given in Table 1.

An external additive-mixed toner was prepared using the spherical hydrophobic fine silica particles thus obtained and evaluated on the degree of aggregation and the adhesion of the toner to the photoreceptor, in the same manner as in Example 1. As a result, the degree of aggregation was 5, indicating that the flowability was good, and no unprinted portions were observed.

Comparative Example 1

An external additive-mixed toner was prepared in the same manner as in Example 1, except that Aerosil R972 (a product by Nippon Aerosil K.K.), a fumed silica, which had been treated to render itself hydrophobic instead of the spherical hydrophobic fine silica particles obtained in Example 1. The fumed silica particles, Aerosil R972, were subjected to the dispersibility test and aggregation accelerating test in the same manner as in Example 1. The results are given in Table 1.

The external additive-mixed toner thus obtained was evaluated on the degree of aggregation and the adhesion of the toner to the photoreceptor, in the same manner as in Example 1. As a result, the degree of aggregation was 43, indicating that the flowability was poor, and many unprinted portions were observed.

Comparative Example 2

An external additive-mixed toner was prepared in the same manner as in Example 1, except that Nipsil SS50F (trade name, product by Nippon Silica K.K.) was used instead of the spherical hydrophobic fine silica particles obtained in Example 1. The particles of Nipsil SS50F were subjected to the dispersibility test and aggregation accelerating test in the same manner as in Example 1. The results are given in Table 1.

The external additive-mixed toner thus obtained was evaluated on the degree of aggregation and the adhesion of the toner to the photoreceptor, in the same manner as in Example 1. As a result, the degree of aggregation was 52, indicating that the flowability was poor, and many unprinted portions were observed.

Comparative Example 3

A toner was obtained in the same manner as in Example 1, except that the spherical hydrophobic fine silica particles of Example 1 was not added. The toner thus obtained was evaluated on the degree of aggregation and the adhesion of the toner to the photoreceptor, in the same manner as in Example 1. As a result, the degree of aggregation was 97, indicating that the flowability was bad, and many unprinted portions were observed.

As shown above, the external additive for toners according to the present invention for an electrostatically charged latent image, not only flowability, anti-caking property, fixing property, and cleaning properties of a developer are enhanced, but also change in quality, scraping of photoreceptors and adhesion of a toner to the photoreceptor are not occurred.

What is claimed is:

1. An external additive for electrostatically charged latent image developing toner, comprising spherical hydrophobic fine silica particles having primary particles having a particle diameter of from 0.01 to 5 µm, which fine silica particles fulfill the following conditions (i) and (ii):

(i) when an organic compound which is liquid at room temperature and has a dielectric constant of from 1 to 40 F/m and fine silica particles are mixed in a weight ratio of 5:1 and shaken, the fine silica particles disperse uniformly in the organic compound; and (ii) the quantity of primary particles remaining as primary particles when methanol is evaporated under heating by means of an evaporator from a dispersion prepared by dispersing the fine silica particles in methanol and thereafter the particles are held at a temperature of 100° C. for 2 hours, represents at least 20% of the quantity of primary particles originally present, said hydrophobic silica fine particles being obtained by the step (A) of introducing an $R^2SiO_{3/2}$ unit (wherein $R^2$ represents a substituted or unsubstituted monovalent hydrocarbon group having 1 to 20 carbon atoms) onto the surfaces of hydrophilic fine silica particles comprising an $SiO_2$ unit to obtain first hydrophobic fine silica particles; and the step (B) of introducing an $R^1{}_3SiO_{1/2}$ unit (wherein $R^1$'s may be the same or different and each represent a substituted or unsubstituted monovalent hydrocarbon group having 1 to 6 carbon atoms) onto the surfaces of the first hydrophobic fine silica particles.

2. The external additive according to claim 1, wherein said primary particles have a particle diameter of from 0.05 to 0.5 µm.

3. A one-component developer comprising a toner with an external additive as claimed in claim 1 to the toner.

4. The one component developer according to claim 3, wherein the amount of the external additive is in a range of 0.01 to 20 parts by weight per 100 parts by weight of the toner.

5. The one component developer according to claim 4, wherein the amount of the external additive is in a range of 0.01 to 5 parts by weight per 100 parts by weight of the toner.

6. A two-component developer comprising a toner with an external additive as claimed in claim 1 and a carrier.

7. The two-component developer according to claim 6, wherein the amount of the external additive is in a range of 0.1 to 5 parts by weight per 100 parts by weight of the toner.

8. The external additive according to claim 1, wherein said hydrophilic fine silica particles used in the step (A) are those obtained by a process comprising the step of subjecting at least one compound selected from the group consisting of a tetrafunctional silane compound represented by the general formula (I):

(wherein $R^3$'s may be the same or different and each represent a monovalent hydrocarbon group having 1 to 6 carbon atoms) and a partial hydrolysis-condensation product thereof, to hydrolysis and condensation in a mixed solvent of water and a hydrophilic organic solvent containing a basic substance, to obtain a hydrophilic fine silica particle mixed-solvent dispersion, and subsequently the step of converting the dispersion medium of the hydrophilic fine silica particle mixed-solvent dispersion into water to prepare an aqueous hydrophilic fine silica particle dispersion.

9. The external additive according to claim 8, wherein said tetrafunctional silane compound represented by the general formula (I) is selected from the group consisting of tetramethoxysilane, tetraethoxysilane, tetraisopropoxysilane, tetrabutoxysilane and a partial hydrolysis-condensation product of any of these tetraalkoxysilanes.

10. The external additive according to claim 8, wherein said hydrophilic organic solvent is an alcohol solvent represented by the general formula (V):

wherein $R^6$ represents a monovalent hydrocarbon group having 1 to 6 carbon atoms.

11. The external additive according to claim 8, wherein said basic substance is ammonia.

12. The external additive according to claim 1, wherein:

the step (A) comprises adding to an aqueous dispersion or mixed-solvent dispersion containing the hydrophilic fine silica particles a trifunctional silane compound represented by the general formula (II):

(wherein $R^2$ represents a substituted or unsubstituted monovalent hydrocarbon group having 1 to 20 carbon atoms, and $R^4$'s may be the same or different and each represent a monovalent hydrocarbon group having 1 to 6 carbon atoms) or a partial hydrolysis-condensation product thereof or a mixture of these, to treat the surface of the hydrophilic fine silica particles with it to obtain an aqueous hydrophobic fine silica particle dispersion; and the step (B) comprises the step of converting the dispersion medium of the aqueous hydrophobic fine silica particle dispersion into a ketone solvent to obtain a hydrophobic fine silica particle ketone solvent dispersion, and the step of adding to the hydrophobic fine silica particle ketone solvent dispersion a monofunctional silazane compound represented by the general formula (III):

(wherein $R^1$'s may be the same or different and each represent a substituted or unsubstituted monovalent hydrocarbon group having 1 to 6 carbon atoms), a monofunctional silane compound represented by the general formula (IV):

(wherein $R^1$'s are as defined in the general formula (III), and X represents a hydroxyl group or a hydrolyzable group) or a mixture of these to make triorganosilylation of reactive groups remaining on the surfaces of the hydrophobic fine silica particles.

13. The external additive according to claim 12, wherein said ketone solvent is methyl isobutyl ketone.

* * * * *